ns
3,125,561
HEAVY METAL-CONTAINING MONOAZO DYES
Fabio Beffa and Guido Schetty, Basel, Switzerland, assignors to J. R. Geigy A.-G., Basel, Switzerland
No Drawing. Filed Oct. 11, 1960, Ser. No. 61,814
Claims priority, application Switzerland Oct. 12, 1959
7 Claims. (Cl. 260—146)

The present invention concerns metalliferous monoazo dyes, methods of producing same and their use for dyeing synthetic and natural organic polypeptide materials in interesting blue-green to olive shades of very good fastness properties.

We have found that tetradentate metalliferous monoazo dyes comprising the general structural Formula I are distinguished by very interesting blue-green to olive shades and by very good fastness properties of the dyeings produced therewith.

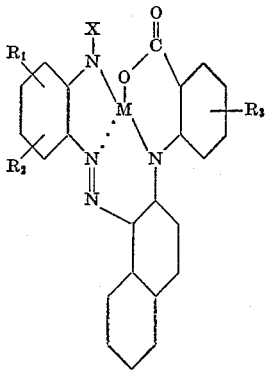

(I)

In this formula:

X represents a member selected from the group consisting of lower aliphatic sulphonic acid acyl and of mononuclear isocyclic-aromatic sulphonic acid acyl radicals, more particularly X represents (1) lower alkyl sulphonic acid acyl such as methylsulphonyl, ethylsulphonyl, butylsulphonyl; (2) lower chloroalkyl sulphonic acid acyl such as chloromethylsulphonyl, chloroethylsulphonyl; (3) phenyl sulphonic acid acyl; (4) lower alkylphenyl sulphonic acid acyl such as, e.g., 2- or 4-methylphenyl or 2- or 4-ethylphenyl sulphonyl, 2,4-, 2,5- or 3,4-dimethylphenylsulphonyl, 2,3- or 3,4-tetramethylene-phenylsulphonyl; (5) halophenyl sulphonic acid acyl such as, e.g., 2- or 4-chloro- or 2- or 4-bromo-phenylsulphonyl, 2,4- or 2,5- or 3,4-dichloro- or -dibromo-phenylsulphonyl; (6) lower alkoxyphenyl sulphonic acid acyl such as, e.g., 4-methoxy and 4-ethoxy- and 4-butoxy-phenylsulphonyl; (7) lower alkylsulphonylphenyl sulphonic acid acyl such as, e.g., 3-methylsulphonyl - phenylsulphonyl, 3-chloromethylsulphonyl - phenylsulphonyl, 3-ethylsulphonyl - phenylsulphonyl, 2-methyl- or 2-ethyl- or 2-chloro- or 2-bromo-5 - methylsulphonyl- or -5 - ethylsulphonyl - phenylsulphonyl; (8) sulphamyl-phenylsulphonic acid acyl such as, e.g., 1-phenylsulphonyl-3-sulphonic acid amide, 1-phenylsulphonyl - 3 - sulphonic acid methylamide, 1-phenylsulphonyl-3-sulphonic acid ethylamide, 1-phenylsulphonyl - 3 - sulphonic acid butylamide, 1-phenylsulphonyl - 3 - sulphonic acid dimethylamide, 1-phenylsulphonyl - 3 - sulphonic acid diethylamide, 1-phenylsulphonyl - 3 - sulphonic acid piperidide and 1-phenylsulphonyl-3-sulphonic acid morpholide, M represents a member selected from the group consisting of chromium and cobalt, $R_1$ and $R_2$ each represent a member selected from the group consisting of hydrogen, of lower alkyl such as, e.g., methyl, ethyl, tertiary butyl, tertiary pentyl; lower alkoxy such as, e.g., methoxy, ethoxy, butoxy; halogen such as, e.g. fluorine, chlorine (preferred), bromine, $R_3$ represents a member selected from the group consisting of hydrogen and chlorine.

In this formula the naphthalene radical can also contain further substituents usual in azo dyes, e.g., those defined under $R_1$ and $R_2$.

In the preferred dyes, however, the naphthalene radical is free from additional substituents.

The heavy metal content of our dyes is in the ratio of one chromium or cobalt to one basic monoazo dye. Four of the six co-ordinative valencies of chromium or cobalt are shared by the basic monoazo dye, thus leaving two valencies free for further co-ordination. These may be shared e.g. by aquo radicals. It is, however, preferable to incorporate a two-dentate complex former containing the

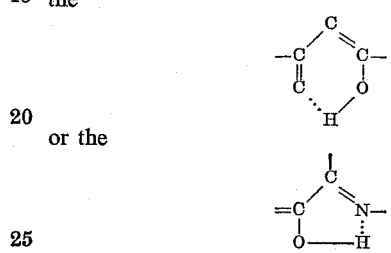

or the structures; e.g. salicylic acid or a derivative thereof and preferably 8-hydroxyquinoline. The two-dentate complex former is incorporated either by performing the metallisation of the basic monoazo dye in the presence thereof or by treating the premetallised 1:1 metal-containing dye therewith.

The basic azo dyes used in our invention are obtained by coupling a diazotised amine of the general Formula II

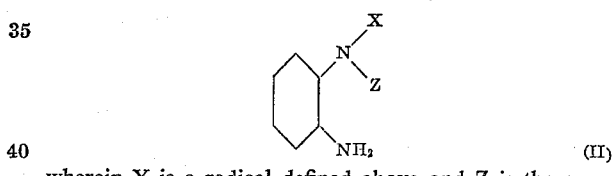

(II)

wherein X is a radical defined above and Z is the same or a different sulphonic acid acyl radical as defined for X and wherein the benzene nuclei can be further substituted as defined above under $R_1$ and $R_2$, with a coupling component of the general Formula III

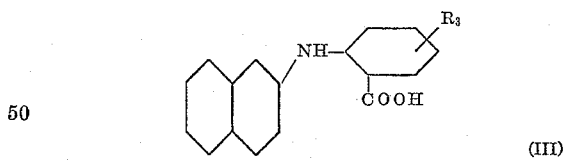

(III)

In this formula $R_3$ represents hydrogen or chlorine.

The coupling is performed in an acid medium, advantageously in the presence of inert polar organic solvents which are soluble in water, e.g. in—or in the presence of—lower aliphatic carboxylic acids such as formic acid, acetic acid and in the presence of lower alkanols, lower alkoxy alkanols, lower fatty acid amides such as dimethyl formamide, dimethyl acetamide, dimethyl sulphoxide.

The dyes thus obtained containing a diacylamino group in o-position to the azo group are easily hydrolised in alkaline solution to the corresponding o-sulphamylamino-azo dyes. By heating the latter with normal or complex salts giving off trivalent chromium or cobalt at raised temperatures for instance in organic-aqueous suspension or solution, e.g. in the presence of lower alkanols such as ethanol, methoxyethanol, ethoxyethanol, ethylene glycol, propylene glycol, or of lower fatty acid amides such as dimethyl formamide, the 1:1 metal complex of the Formula I is formed. By heating the same, e.g. in alkaline, neutral or weakly acid solution, with a bidentate complex former, the stable co-ordinatively saturated most valuable metalliferous dyes of our invention are obtained.

The diazo components used to produce the metalliferous dyes of our invention may be prepared by diacylating o-nitro primary amines of the benzene series with aliphatic or aromatic sulphonic acid halides preferably in the absence of water in—or in the presence of—a strong tertiary nitrogenous base, such as pyridine, picolines, butidines, triethylamine, N-lower alkyl piperidine, N-lower morpholine, and reduction of the nitro group to the amino group. Diazo components containing different acyl radicals in the diacylamino group are obtained by reacting the metal salts of sulphamyl-o-nitrobenzene compounds in dry inert organic solvents at raised temperatures with sulphonic acid acyl halides corresponding to the definition for X, and reduction of the nitro group to the amino group.

Diazo components useful for the manufacture of our metalliferous dyes are for example, 1-bis(methylsulphonyl)-amino-, 1 - bis - (ethylsulphonyl)-amino-, 1-bis-(chloromethylsulphonyl)-amino-, 1-bis-(butylsulphonyl)-amino-, 1-bis-(phenylmethylsulphonyl)-amino-, 1-bis-(4'- or 2'-methylphenylsulphonyl)-amino-, 1-bis-(2',4'- or 3', 4'-dimethylphenylsulphonyl)-amino-, 1-bis-(2'- or 4'-chlorophenylsulphonyl)-amino-, 1-bis-(2', or 4'-bromophenylsulphonyl)-amino-, 1-bis-(2',4'- or 2',5'- or 3',4'-dichlorophenylsulphonyl) - amino-, 1-bis-(3'-sulphamyl-phenylsulphonyl)-amino-, 1-bis-(3'-N-methylsulphamyl-phenylsulphonyl)-amino-, 1-bis-(3'-N-ethylsulphamyl-phenylsulphonyl) - amino-, 1-bis-(3'-N,N-dimethylsulphamyl-phenylsulphonyl)-amino-, 1 - bis - (3'-N,N-diethylsulphamylphenylsulphonyl)-amino-, 1 - bis - (3'-methylsulphonylphenylsulphonyl)-amino-, 1-bis-(3'-ethylsulphonyl-phenylsulphonyl-amino- or 1-bis-(3'-chloromethylsulphonyl-phenylsulphonyl)-amino-2-aminobenzene, or -2-amino-4-methylbenzene, -2-amino-4-tert., butyl benzene, -2-amino-4-chlorobenzene, -2-amino-4-methyl-5-chlorobenzene, -2-amino-4,5- or -4,6-dimethylbenzene, -2-amino-4-methoxybenzene or -2-amino-4-ethoxybenzene.

The coupling components used to produce the metalliferous dyes of our invention are obtained by reacting an appropriate 2-primary aminonaphthalene compound capable of being coupled in 1-position with 2-chloro- or 2-bromo-benzene-1-carboxylic acid alkali metal salts which may contain additional halogen substituents, the reaction being performed at elevated temperatures in the presence of tertiary nitrogenous bases such as pyridine and of copper catalysts.

Coupling components useful for the manufacture of our metalliferous dyes are, for example, 2-(2'-carboxyphenyl)-amino-naphthalene or -6- or -7-methoxy- or -ethoxy-naphthalene, 2-(2'-carboxy-4'- or -5'-chlorophenyl)-amino-naphthalene-, or -6- or -7-methoxy- or -ethoxy-naphthalene.

Of the metalliferous dyes of our invention, especially those containing chromium, are distinguished by their most interesting bluish-green shades which have not been attained until now by metallisation of o-hydroxy-o'-aminoazo dyes. They therefore constitute a preferred embodiment of our invention. Of special interest for the dyeing of wool and synthetic polyamide fibres from neutral to weakly acid baths in clear bluish-green shades of very good fastness properties are the coordinative chromium complexes consisting (a) of a dye of the general Formula I wherein X represents lower aliphatic sulphonic acid acyl and (b) of 8-hydroxyquinoline as the co-ordinated bidentate complex former.

The metalliferous dyes of our invention in addition may be used for dyeing silk and leather, for the dyeing of lacquers and spinning masses containing cellulose esters such as cellulose acetate, and for pigment dyeing of polyplastic materials especially if they are sparingly soluble in ordinary solvents. Those dyes of our invention intended for use as textile dyestuffs to be applied from aqueous solutions are advantageously mixed with usual anion-active dispersing agents.

The dyeings attained with our dyestuffs on polypeptide fibres and in particular, the wool dyeings, have very good fastness to light and rubbing, good washing, sea water, decatising and alkali fastness and, in addition, they are distinguished by the level spreading of the colour.

The following examples illustrate our invention. In these examples, where not otherwise stated, parts are given as parts by weight and the temperatures are in degrees centigrade. Parts by weight correspond to parts by volume in the same way as grammes to cubic centimetres.

EXAMPLE 1

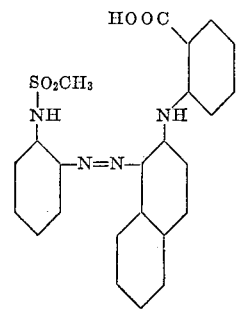

26.4 parts of N-di-(methylsulphonyl)-amino-2-aminobenzene are dissolved in a mixture of 50 parts of glacial acetic acid, 35 parts of hydrochloric acid conc. and 50 parts of warm water and the solution is quickly diazotised at 0–5° with 16.6 parts by volume of 33.3% sodium nitrite solution. The acid solution of the diazonium compound is poured into a suspension of 27.6 parts of 2-(2'-carboxyphenyl)-naphthylamine in 150 parts of glacial acetic acid. The whole is stirred at 40–50° until the diazonium compound has disappeared, water is added, the precipitated dyestuff is filtered off and washed with hot water. To saponify the diacylamino group, the red dyestuff obtained is suspended in 250 parts by volume of water, the pH of the mixture is adjusted to about 13 with the necessary amount of 10 N-caustic soda lye and the reaction mixture is stirred for several minutes at about 100°. The saponified product is precipitated by the addition of hydrochloric acid whereupon it is filtered off, washed with cold water and dried. The sodium salt of the new dyestuff dissolves in water with a red colour.

EXAMPLE 2

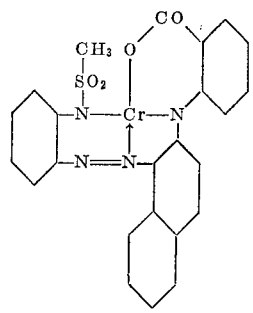

46 parts of the non-metal-containing dyestuffs obtained according to Example 1 and 26 parts of chromic acetate (corresponding to 5.72 parts of chromium) in 150 parts by volume of formamide are heated to 110–120° until the complex formation is complete. The chromium-containing dyestuff is precipitated by the addition of sodium chloride solution, filtered off and dried. It is a green-black powder which dissolves in hot water with a bluish-green shade. This dyestuff can be used as such for the dyeing of lacquers in fast blue-green shades. For the production of a valuable textile dyestuff, it is further worked up as described in Example 3.

EXAMPLE 3

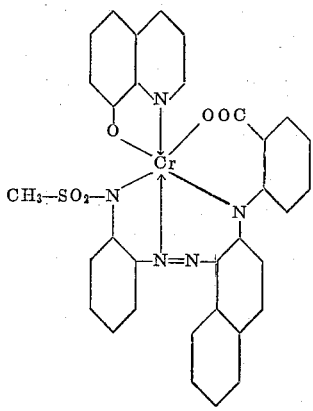

The chromium complex dyestuff obtained as described in Example 2 is dissolved in 150 parts by volume of hot formamide and 27 parts of crystallised sodium acetate and 17.4 parts of 8-hydroxyquinoline are added whereupon the whole is stirred at 110–115° for 60 minutes. The reaction mixture is then poured into 2000 parts by volume of 20% sodium chloride solution. The precipitated dyestuff is filtered off, washed with dilute sodium chloride solution and dried. After drying, it is a dark powder which dyes wool from a neutral bath in pure bluish-green shades. The wool dyeings have very good fastness to wet and light.

If in the above example instead of 8-hydroxyquinoline, 2-hydroxybenzoic acid or 2-hydroxybenzoic acid-5-sulphonic acid anilide are used, then dyestuffs are obtained which dye wool from a weakly acid bath also in green, fast shades.

EXAMPLE 4

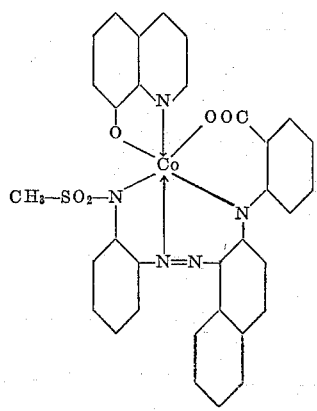

46 parts of the metal-free dyestuff obtained as described in Example 1 and 27.5 parts of cobalt acetate (corresponding to 6.5 parts of cobalt) in 150 parts by volume of formamide are heated for 30 minutes at 95–100°. 27 parts of crystalline sodium acetate and 17.4 parts of 8-hydroxyquinoline are then added to the solution and the whole is stirred for an hour at 95–100°. 2000 parts by volume of 20% sodium chloride solution are then added to the reaction mixture. The precipitated, cobalt-containing dyestuff is filtered off, washed with dilute sodium chloride solution and dried. After drying, it is a dark powder which dyes wool from a neutral to weakly acid bath in fast, olive-green shades.

EXAMPLE 5

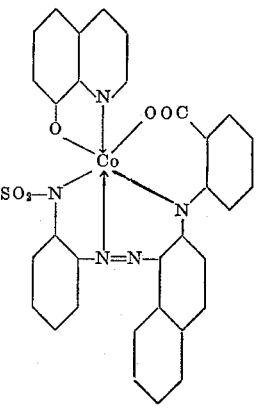

29.2 parts of 1-N-di-(ethylsulphonyl)-amino-2-aminobenzene are dissolved in a mixture of 300 parts by volume of glacial acetic acid, 35 parts of concentrated hydrochloric acid and 50 parts of warm water and the solution is diazotised at 0–5° with 16.6 parts by volume of 33.3% sodium nitrite solution.

27.6 parts of 2-(2'-carboxyphenyl)-naphthylamine are added to the diazonium compound and the dyestuff formation is completed by heating the reaction mixture at 50°. On completion of the coupling, the dyestuff is precipitated by the addition of water, filtered off and washed with cold water. To saponify, the dyestuff is suspended in 300 parts by volume of glycol monomethyl ether 1:1 and, at 100°, sufficient 10 N-caustic soda lye is added to ensure a strong alkaline reaction until the saponification is complete. The whole is then stirred at this temperature for several minutes until no more starting dyestuff can be traced. The solution of the saponified dyestuff is then diluted with cold water and the dyestuff is precipitated by the addition of sodium chloride solution and hydrochloric acid. It is filtered off, washed with dilute sodium chloride solution and dried.

The dyestuff is metallised by heating it in 250 parts by volume of formamide with 27.5 parts of cobalt acetate (corresponding to 6.5 parts of cobalt) until the complex formation is complete—the heating being performed in the presence of 17.4 parts of 8-hydroxyquinoline and 27 parts of sodium acetate at 90–95°. 25% sodium chloride solution is added to the dark melt and the whole is stirred until the cobalt-containing dyestuff has precipitated. It is filtered off, washed with dilute sodium chloride solution and dried.

The dry dyestuff is obtained in the form of a dark powder which dissolves in hot water with a green colour. It dyes wool from a neutral to weakly acid bath in fast olive green shades.

If in the above example the 1-N-di-(ethylsulphonyl) amino-2-aminobenzene is replaced by 27.8 parts of 1-N-di - (methylsulphonyl) - amino-4-methyl-2-aminobenzene or 29.4 parts of 1-N-di-(methylsulphonyl)-amino-4-methoxy-2-aminobenzene, then dyestuffs having similar properties are obtained.

EXAMPLE 6

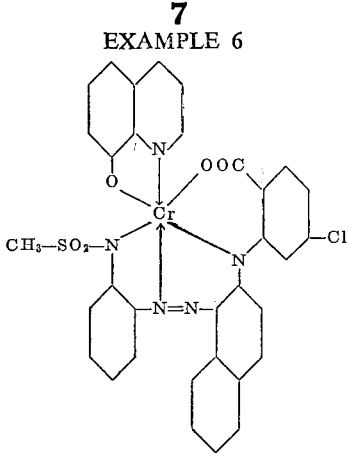

26.4 parts of 1-N-di-(methylsulphonyl)-amino-2-aminobenzene are diazotised as described in Example 1 and coupled with 31.3 parts of 2-(5'-chloro-2'-carboxyphenyl)-naphthylamine. The dyestuff obtained is then suspended in 250 parts by volume of water and, after the addition of 35 parts by volume of 10 N-caustic soda lye, the whole is stirred for 25 minutes at about 100° whereby an acyl group is split off. The saponified dyestuff is precipitated with hydrochloric acid. It is filtered off, washed with cold water and dried. It is metallized by heating with chromic acetate (corresponding to 5.72 parts of chromium) in 150 parts by volume of formamide at 110–115° until no more starting dyestuff can be traced. The chroming mixture is then stirred at 110–115° with 27 parts of sodium acetate and 17.4 parts of 8-hydroxyquinoline until the addition product has formed. The new chromium complex dyestuff is precipitated by the addition of sodium chloride. It is filtered off, washed with dilute sodium chloride solution and dried. After drying it is a dark powder. It dyes wool from a neutral or weakly acid bath in bluish green shades which have good fastness properties.

EXAMPLE 7

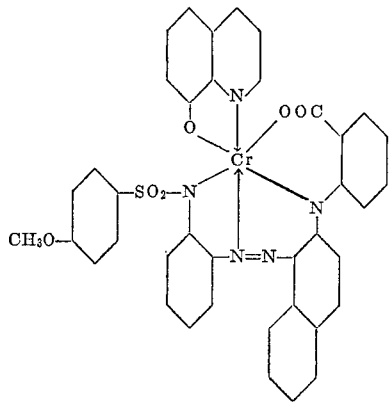

44.8 parts of 1-N-di-(p-methoxyphenylsulphonyl)-amino-2-aminobenzene are stirred in 300 parts by volume of glacial acetic acid and dissolved to a considerable extent with 35 parts of concentrated hydrochloric acid. The amine is diazotised by the addition of sodium nitrite and then the excess mineral acid is buffered by the addition of sodium acetate.

27.6 parts of 2-(2'-carboxyphenyl)-naphthylamine are added to the diazonium compound, and the dyestuff formation is completed by heating to 50°. The dyestuff is precipitated by the addition of water, filtered off and washed with cold water. To saponify the diacylamino group, the dyestuff obtained is stirred for 1 hour at about 100° in 150 parts by volume of glycol monomethyl ether and 150 parts by volume of water and 35 parts by volume of 30% caustic soda lye. The dyestuff is precipitated by the addition of cold water and hydrochloric acid, filtered off and dried.

It is metallised with chromic acetate in formamide as described in Example 6 and then reacted with 8-hydroxyquinoline.

The new chromium complex dyestuff is precipitated by the addition of sodium chloride solution, filtered off and washed with dilute sodium chloride solution. After drying, it is a dark powder which, after mixing with dispersing agents, dissolves in water with a green-blue colour. It dyes wool from a neutral to weakly acid bath in very fast green shades.

Further dyestuffs according to our invention are produced by the processes described in Examples 1 to 7 on using corresponding amounts of the diazonium compounds given in the following table in column II and of the coupling components given in column III and on using the salts of the heavy metals shown in column IV and reacting the metalliferous dyestuffs obtained with 8-hydroxyquinoline. The shades of the wool dyeings obtained with these dyestuffs are given in column V.

Table

| I No. | II Diazonium component | III Coupling component | IV Metal | V Shade on wool |
|---|---|---|---|---|
| 1 | 1-N-di-(ethylsulphonyl)-amino-2-aminobenzene. | 2-(2'-carboxyphenyl)-naphthylamine. | Cr | green. |
| 2 | 1-N-di-(p-methoxyphenylsulphonyl)-amino-2-aminobenzene. | ----do---- | Co | olive. |
| 3 | 1-N-di-(p-toluene sulphonyl)-amino-2-aminobenzene. | ----do---- | Cr | green. |
| 4 | ----do---- | ----do---- | Co | olive. |
| 5 | 1-N-di-(phenylsulphonyl)-amino-2-aminobenzene. | ----do---- | Cr | green. |
| 6 | 1-N-di-(chloromethylsulphonyl)-amino-4-methyl-2-aminobenzene. | ----do---- | Cr | Do. |
| 7 | 1-N-di-(chloromethylsulphonyl)-amino-4-methoxy-2-aminobenzene. | ----do---- | Cr | Do. |
| 8 | 1-N-di-(methylsulphonyl)-amino-4-methyl-2-amino-benzene. | 2-(5'-chloro-2'-carboxyphenyl)-naphthylamine. | Cr | Do. |
| 9 | 1-N-di-(methylsulphonyl)-amino-4-methoxy-2-amino-benzene. | ----do---- | Cr | Do. |
| 10 | 1-N-di-(phenylsulphonyl)-amino-2-aminobenzene. | ----do---- | Cr | Do. |
| 11 | 1-N-di-(p-chlorophenylsulphonyl)-amino-2-aminobenzene. | 2-(2'-carboxyphenyl)-naphthylamine. | Cr | Do. |
| 12 | ----do---- | ----do---- | Co | olive. |
| 13 | 1-N-di-(3'-methylsulphonyl-phenylsulphonyl)-amino-2-aminobenzene. | ----do---- | Cr | green. |
| 14 | ----do---- | 2-(5'-chloro-2'-carboxyphenyl)-naphthylamine. | Cr | Do. |
| 15 | 1-N-di-(3'-amidosulphonyl-phenylsulphonyl)-amino-2-aminobenzene. | ----do---- | Cr | Do. |
| 16 | ----do---- | 2-(2'-carboxyphenyl)-naphthylamine. | Cr | Do. |
| 17 | 1-N-di-(3'-methylamidosulphonyl-phenylsulphonyl)-amino-2-aminobenzene. | ----do---- | Cr | Do. |
| 18 | 1-N-di-(3'-ethylamidosulphonyl-phenylsulphonyl)-amino-2-aminobenzene. | ----do---- | Cr | Do. |
| 19 | 1-N-di-(3'-dimethylamidosulphonyl-phenylsulphonyl)-amino-2-aminobenzene. | ----do---- | Cr | Do. |
| 20 | ----do---- | 2-(4'-chloro-2'-carboxyphenyl)-naphthylamine. | Cr | Do. |
| 21 | 1-N-di-(methylsulphonyl)-amino-4-ethoxy-2-amino-benzene. | ----do---- | Cr | Do. |
| 22 | ----do---- | 2-(2'-carboxyphenyl)-naphthylamine. | Cr | Do. |
| 23 | 1-N-di-(methylsulphonyl)-amino-4-methyl-5-chloro-2-aminobenzene. | ----do---- | Cr | Do. |
| 24 | 1-N-di-(methylsulphonyl)-amino-4,5-dimethyl-2-aminobenzene. | ----do---- | Cr | Do. |

| I No. | II Diazonium component | III Coupling component | IV Metal | V Shade on wool |
|---|---|---|---|---|
| 25 | 1-N-di-(methylsulphonyl)-amino-4,5-dimethyl-2-aminobenzene. | 2-(5'-chloro-2'-carboxyphenyl)-naphthylamine. | Cr | green. |
| 26 | 1-N-di-(methylsulphonyl)-amino-4-methyl-5-chloro-2-aminobenzene. | ‒‒‒‒do‒‒‒‒ | Cr | Do. |
| 27 | 1-N-di-(methylsulphonyl)-amino-4-methyl-2-amino-benzene. | 2-(2'-carboxyphenyl)-naphthylamine. | Cr | Do. |

EXAMPLE 8

4 parts of the chromium-containing dyestuff obtained according to Example 3 are dissolved in 4000 parts of water and 100 parts of previously well wetted wool are introduced into the dyebath at 40–50°. The bath is brought to the boil within half an hour, kept boiling for 45 minutes and then the wool is rinsed and dried. The bluish-green dyeing has good wet fastness properties and very good fastness to light.

What we claim is:

1. Metalliferous monoazo dye consisting of a metal compound of the formula

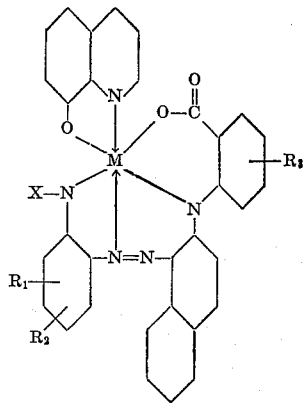

wherein

X represents a member selected from the group consisting of (lower)alkylsulfonyl, chloro(lower)alkylsulfonyl, phenylsulphonyl, (lower)alkylphenylsulphonyl, chlorophenylsulphonyl, bromophenylsulfonyl, (lower)alkoxyphenylsulphonyl and (lower)alkylsulphonylphenylsulphonyl, M represents a member selected from the group consisting of chromium and cobalt, $R_1$ and $R_2$ each represents a member selected from the group consisting of hydrogen, lower alkyl, lower alkoxy and chloro, and $R_3$ represents a member selected from the group consisting of hydrogen and chlorine.

2. The dyestuff consisting of the chromium complex of the formula

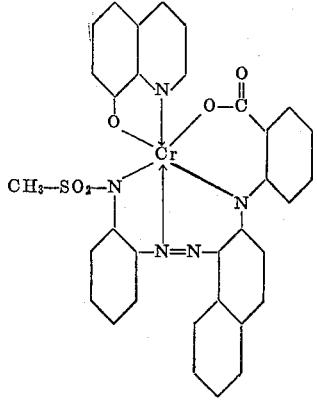

3. The dyestuff consisting of the chromium complex of the formula

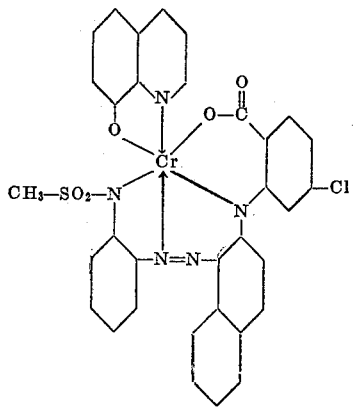

4. The dyestff consisting of the chromium complex of the formula

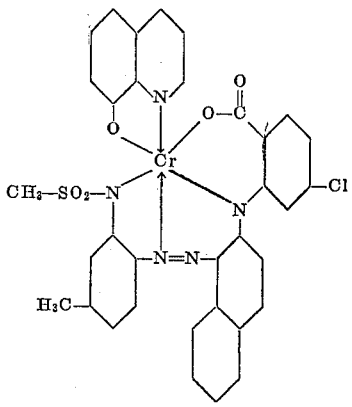

5. The dyestuff consisting of the chromium complex of the formula

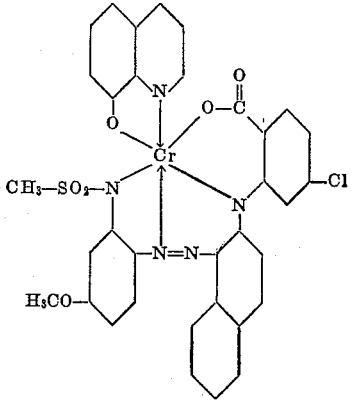

6. The dyestuff consisting of the chromium complex of the formula
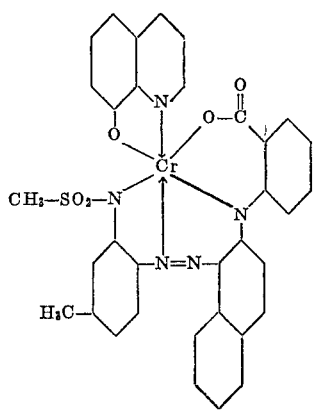
7. The dyestuff consisting of the chromium complex of the formula
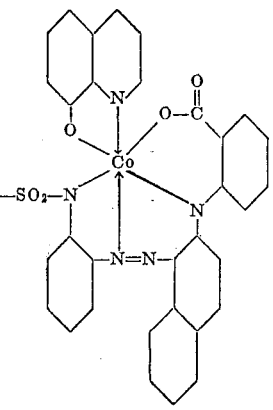
References Cited in the file of this patent
UNITED STATES PATENTS
2,182,055 Schweitzer _____ Dec. 5, 1939
2,824,094 Ackerman et al. _____ Feb. 18, 1958